Figure 1:
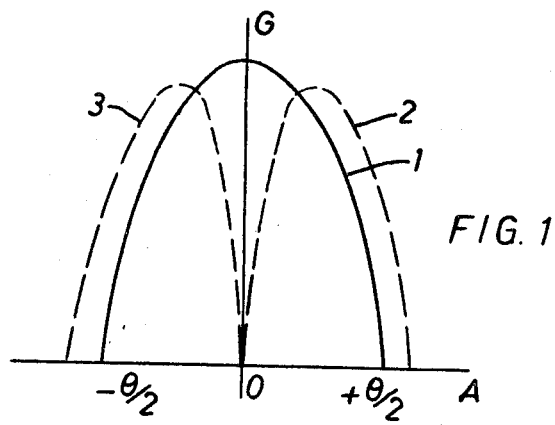

United States Patent

Laverick et al.

[15] 3,636,563
[45] Jan. 18, 1972

[54] AERIAL ARRANGEMENTS

[72] Inventors: Robert Clement Laverick, Yateley; Peter Rothwell Smith, Windsor, both of England

[73] Assignee: Electric & Musical Industries Limited, Hayes, Middlesex, England

[22] Filed: May 13, 1969

[21] Appl. No.: 824,141

[30] Foreign Application Priority Data

May 31, 1968 Great Britain......................26,084/68

[52] U.S. Cl. ........................343/113 R, 343/16 M, 343/771
[51] Int. Cl. ..........................................G01s 3/02, G01s 9/22
[58] Field of Search..........................343/16 M, 771, 113 R

[56] References Cited

UNITED STATES PATENTS 3,526,898  9/1970  Plunk et al..............................343/771
2,981,948  4/1961  Kurtz..................................343/16 M X
3,150,375  9/1964  Bevan et al. .......................343/771 X
3,471,857  10/1969  Schwartz............................343/16 M
3,508,275  4/1970  Deveau et al. ..................343/771 X Primary Examiner—T. H. Tubbesing
Attorney—William W. Downing, Jr.

[57] ABSTRACT

There is provided an aerial arrangement especially applicable to monopulse radar apparatus, comprising two interleaved arrays of aerials, the response of one array conforming to a sum pattern and the response of the other array conforming to a difference pattern, with output signals derived from the first array being in phase quadrature to output signals derived from the other array so that there is substantially no mutual coupling between the arrays. Preferably the interleaving of the arrays is sufficiently close that unwanted sidelobes do not appear, and the arrays comprise arrays of slotted waveguide aerials.

4 Claims, 2 Drawing Figures

3,636,563

AERIAL ARRANGEMENTS

The present invention relates to aerial arrangements especially but not exclusively to aerial arrangements for monopulse radar apparatus.

Monopulse radar apparatus uses an aerial arrangement having two different patterns, one a single-lobe pattern and the other a double-lobe pattern occupying a slightly greater angular spread than the single-lobe pattern, the two lobes of the double-lobe pattern being of equal gain, producing outputs of opposite phases, and being separated by a region of zero response. The returns from a single emitted pulse received by the aerial arrangement due to the two patterns are separately amplified and the signal received by the two-lobe pattern is used, with the signal from the single-lobe pattern as a reference, to produce an indication of the direction and extent of offset of the target producing the return from the axis of the aerial arrangement. The single-lobe pattern is usually referred to as the sum pattern and the double-lobe pattern as the difference pattern; this terminology is used in this specification.

Hitherto the sum and difference patterns have been achieved by a pair of similar aerials connected to a hybrid ring junction from which signals corresponding to the sum and difference patterns are derived, but it has been found that the pair of aerials naturally couple one with the other and the coupling between the aerials degrades their performance. It is possible to design the two aerials so as to obtain zero coupling, or orthogonality, between the two aerials but the aerials so designed have patterns which combine to produce sum and difference patterns which are far from optimum.

It is an object of the present invention to provide an aerial arrangement in which the above difficulties are substantially overcome.

According to the present invention there is provided an aerial arrangement comprising two interleaved arrays the response of one array conforming to a sum pattern, and the response of the other array conforming to a difference pattern, output signals derived from the first array being in phase quadrature to output signals derived from the other array so that there is substantially no mutual coupling between the arrays.

Preferably the interleaving of said arrays is sufficiently close that unwanted grating lobes are substantially reduced.

Figure 2:
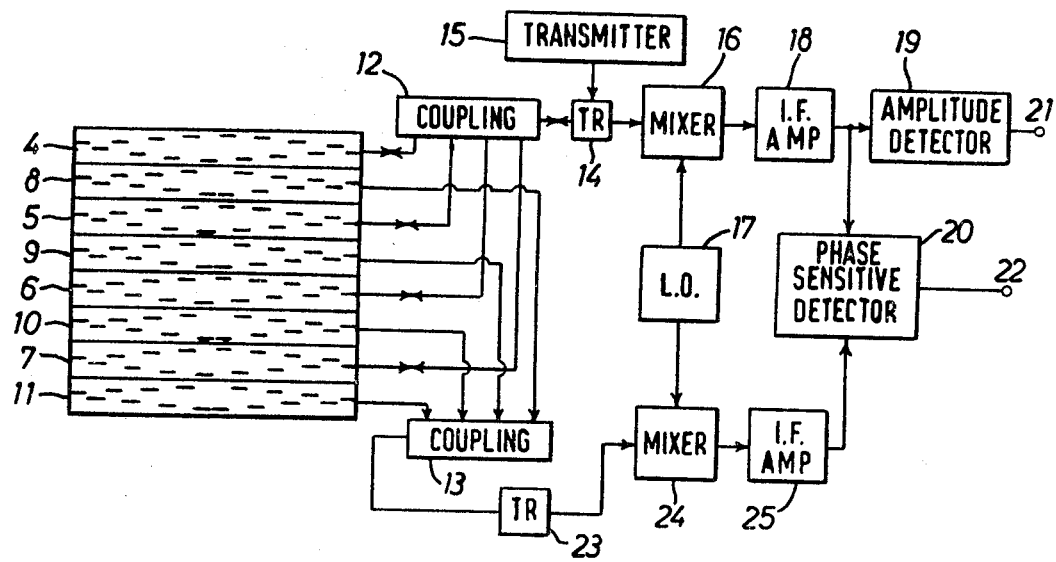

In order that the invention may be fully understood and readily carried into effect it will now be described with reference to the accompanying drawings of which:

FIG. 1 is a diagram showing the sum and difference patterns of an aerial arrangement according to the invention, FIG. 2 is a diagram of a monopulse radar apparatus using an aerial arrangement according to one example of the invention.

In FIG. 1 there is shown by an unbroken curved line 1 a typical sum pattern response required of one of the arrays included in an arrangement shown in FIG. 2, the response being plotted with an ordinate of aerial gain G against an abscissa of azimuth A. From FIG. 1 it will be seen that the lobe forming the sum pattern is $\Theta$ symmetrically disposed about a zero position. The difference pattern on the other hand is represented by dotted lines 2 and 3 which form two lobes, both of width slightly greater than $\Theta/2$ abutting one against the other at the zero position. The right-hand lobe 2 produces an output in phase quadrature to the sum signal and the left-hand lobe 3 produces an output of opposite phase to the right-hand lobe 2.

Referring now of FIG. 2 the aerial arrangement shown comprises two interleaved arrays of slotted waveguide aerials, each array consisting of four guides. The slots in the guides are represented by the short lines within the respective rectangles. The slots in the four guides 4, 5, 6 and 7 combine to form the array having the sum pattern response 1 and the slots in the four guides 8, 9, 10 and 11 combine to form an array having the difference pattern responses 2 and 3, the slots in the guides 8 to 11 being selected to cause the output of the guides 8 to 11 to be in phase quadrature with the output of the guides 4 to 7, and to be in one phase or other depending on the direction from which a pulse is received. The guides 4 to 11 may conveniently be ridge guides. The angles indicated in FIG. 1 are measured in planes perpendicular to the parallel axes of the guides. In FIG. 2 the guides 4, 5, 6 and 7 are shown diagrammatically as being joined to a coupling arrangement 12 which distributes the energy from a transmitter 15 to the respective guides 4 to 7 when a pulse is transmitted and combines the energy from the guides 4 to 7 when a pulse is received. Similarly, the guides 8, 9, 10 and 11 are connected to a coupling arrangement 13 which serves to combine the energy from the guides 8 to 11 when a pulse is received. As the patterns are substantially produced by the same aperture, and are sum and difference patterns respectively whose outputs are mutually in phase quadrature they are inherently orthogonal with the result that there is substantially no mutual coupling between the aerial arrays. The coupling arrangement 12 is connected to a directional coupler 14 which is connected to the transmitter 15 and to a mixer 16. Local oscillations are fed to the mixer 16 from an oscillator 17 and the intermediate frequency signals produced by the mixer 16 are amplified by an amplifier 18 and applied to both an amplitude detector 19 and a phase sensitive detector 20. The detected signals from the detector 19 appear at an output terminal 21 and the signals from detector 20 appear at an output terminal 22. The signals from the coupling arrangement 13 are applied via a directional coupler 23 to a mixer 24 where they are mixed with local oscillations from the oscillator 17 and the intermediate frequency signals so produced are amplified in an amplifier 25 and applied to a second input of detector 20. The directional coupler 23 is provided merely to ensure that the sum and difference signals derived from a received pulse are subjected to equal phase shifts in passing to the respective mixers 16 and 24.

In the operation of the arrangement shown in FIG. 2 a pulse of oscillation is produced by the transmitter 15 and directed by the directional coupler 14 to the coupling arrangement 12. The coupling arrangement 12 applies the energy to the waveguides 4, 5, 6 and 7 to emit a radar pulse along a beam of width corresponding to the sum pattern. If the transmitted energy impinges on a target a return signal is produced which is received by the two aerial arrays respectively comprised by the slotted guides 4, 5, 6 and 7 and the slotted guides 8, 9, 10 and 11. The coupling arrangement 12 therefore produces an output signal the amplitude of which depends on the sum pattern and the coupling arrangement 13 produces a second output signal which depends on the difference pattern as shown in FIG. 1. The signals from the coupling arrangements 12 and 13 are respectively applied to mixers 16 and 24 and after amplification in 18 and 25 are applied to the phase sensitive detector 20. The detector 20 being phase sensitive is arranged to detect the second output signal from the coupling arrangement 13 with reference to a phase which is related to that of the output signal from the coupling arrangement 12 so that an output signal is produced at the terminal 22 the polarity of which represents the direction of offset of the target from the axis of the lobe of sum pattern 1, and the amplitude of which represents the extent of the offset. The detector 19 responds solely to the received signal produced by the sum pattern array and may be used for ranging and automatic gain control purposes.

As the direction and magnitude of the offset of the target from the axis of the lobe of sum pattern 1 are represented by the output signal of the detector 20 produced at the terminal 22 this signal may be used to tilt the aerial arrangement to follow the target in elevation if the aerial arrangement is mounted with the axes of the guides horizontal. To follow the target in azimuth the lobe patterns are shifted by altering the phases of the signals in the guides; that is to say the lobes are shifted a fixed amount, say 1°, left and a fixed amount right, the difference between difference signals derived in each case representing the polarity and magnitude of the extent of the offset of the target in azimuth, which difference signal is used to further shift the phases of the signals in the guides in such a way that the lobe patterns tend to follow the target in azimuth.

The target could possibly be followed in elevation as well by shifting the lobe patterns in dependence upon the output of detector 20, by means of phase shifting devices which alter the phases of the signals in the guides in a direction at right angles to the guide axes.

In addition to its use for target following the output of the detector 20 may be used to assist in the production of a moving target display from sideways looking radar apparatus carried by an aircraft.

What we claim is:

1. An aerial arrangement comprising a first array of aerials adapted to have a response conforming to a sum pattern, and a second array of aerials interleaved with said first array and adapted to have a response conforming to a difference pattern and so that output signals derived from the second array are in phase quadrature to output signals derived from said first array, whereby there is substantially no mutual coupling between the arrays.

2. An aerial arrangement according to claim 1 in which each of said arrays of aerials comprises an array of slotted waveguide aerials.

3. An aerial arrangement according to claim 2 in which said slotted waveguide aerials comprise ridge waveguide aerials.

4. An aerial arrangement according to claim 1 further including means coupled to the arrangement for deriving a first signal from said first array due to a target, means coupled to the arrangement for deriving a further signal from said second array due to said target, and means for utilizing said first signal as a reference signal in conjunction with said further signal to determine the direction and magnitude of the offset of said target from the axis of the lobe of the sum pattern.

* * * * *